United States Patent [19]

Martin

[11] Patent Number: 5,340,127
[45] Date of Patent: Aug. 23, 1994

[54] CHUCK FOR TOOL

[75] Inventor: Zollmann Martin, Sonnenbühl-Undingen, Fed. Rep. of Germany

[73] Assignee: Zollmann GmbH, Sonnenbühl-Undingen, Fed. Rep. of Germany

[21] Appl. No.: 40,136

[22] Filed: Mar. 30, 1993

[51] Int. Cl.⁵ ............................................. B23B 51/08
[52] U.S. Cl. ................................... 279/20; 279/46.9; 279/157; 408/57
[58] Field of Search .................. 279/20, 43.9, 46.9, 279/48, 49, 51, 52, 56, 59, 157; 408/57, 59; 409/136

[56] References Cited

U.S. PATENT DOCUMENTS

| | | | |
|---|---|---|---|
| 2,380,648 | 7/1945 | Hite | 279/46.9 |
| 2,562,455 | 7/1951 | Gridley | 279/46.9 X |
| 2,711,904 | 6/1955 | Gartner et al. | 279/46.9 |
| 5,020,946 | 6/1991 | Nann | 279/20 X |
| 5,028,178 | 7/1991 | Ronen | 279/156 X |

FOREIGN PATENT DOCUMENTS

| | | |
|---|---|---|
| 8704477 | 6/1987 | Fed. Rep. of Germany. |
| 9003903 | 7/1990 | Fed. Rep. of Germany. |
| 3823349 | 11/1990 | Fed. Rep. of Germany. |
| 784104 | 3/1982 | U.S.S.R. ............... 279/46.9 |

*Primary Examiner*—Steven C. Bishop
*Attorney, Agent, or Firm*—Michael J. Striker

[57] ABSTRACT

A chuck for a tool with an inner cooling medium supply has a clamp holder having a cooling medium supply passage, a clamping nut anchorable in the clamp holder, and a ring-shaped sealing meter which is carried by the clamping nut and abuts against a clamped tool, the clamping nut having an outer concentric recess which surrounds the inserted tool and is formed so that the sealing member is exchangeably insertable from outside into the recess.

5 Claims, 1 Drawing Sheet

CHUCK FOR TOOL

BACKGROUND OF THE INVENTION

The present invention relates to a chuck for a tool with an inner cooling medium supply.

In particular, it relates to a chuck which has cooling medium supply passage in a clamp holder, an exchangeable clamp, a clamping nut anchorable on the clamp holder, and a ring-shaped sealing body which is supported by the clamping nut and abut against the clamped tool.

Various constructions of chucks are known which during the use of tools having an inner axial cooling medium passage must prevent in the chuck an escape of the cooling medium supplied through the chuck. The known constructions have the disadvantage that the tool or the important centering part of the clamping chuck can be affected by abutment against a seal in its centering action. A further disadvantage is that for different clamp constructions a universal clamp holder must be provided; however, special seals dimensioned in accordance with their constructions are required. For each tool diameter a special seal is needed since the clamped tool shaft must be sealed to prevent the escape of the cooling fluid. For changing the seals, the chuck can be removed and then the new seals are mounted. This disadvantage is characteristic also for a known construction in which the seal is arranged on the chuck and can be exchanged or inserted after the removal of the chuck.

SUMMARY OF THE INVENTION

Accordingly, it is an object of the present invention to provide a chuck for a tool, which avoids the disadvantages of the prior art.

More particularly, it is an object of the present invention to provide such a chuck of the above mentioned type in which the utilized sealing members are independent of the type of the clamp used in the clamping clamp holder, and, with a clamped tool they can be inserted or exchanged without opening of the chuck.

In keeping with these objects and with others which will become apparent hereinafter, one feature of the present invention resides, briefly stated, in a chuck in which a sealing member is arranged exchangeably from outside in an outer, concentric recess of the nut which recess surrounds the inserted tool.

The ring-shaped sealing member can preferably be held in abutment against the nut by an outwardly accessible spring ring which engages an outer shoulder of the sealing member.

The chuck in accordance with the present invention requires low structural expenses for sealing of the chuck from outside and allows a fast sealing member exchange, by removing a spring ring which subsequently must be inserted again. Also, the sealing member has a simple cross-section which facilitates its size-accurate manufacture. It suffices to provide a uniform set of ring-shaped sealing bodies which is independent of the type of the chuck and which differ from one another only by an inner diameter corresponding to the tool diameter.

In order to increase the sealing action, the ring-shaped sealing member can be provided with at least one annular groove for receiving an O-sealing ring on its radial inner side which faces an inserted tool shaft. In addition, at least one sealing ring can be arranged between the ring-shaped sealing member and a limiting wall of the recess which receives the sealing member. Thereby a reliable sealing can be also guaranteed when the tool shaft must have outer unevenness, or such unevenness is produced due to impact or pushing action against the sealing member or the walls of the recess of the chuck.

The chuck formed in accordance with the present invention permits the exchange of the sealing member after the clamping of a tool when for example, with beginning of the tool operation, an untightness must be produced at the sealing body which then must be eliminated without unclamping the tool and without changing the chuck clamping by insertion of another sealing member or another O-ring in the sealing member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
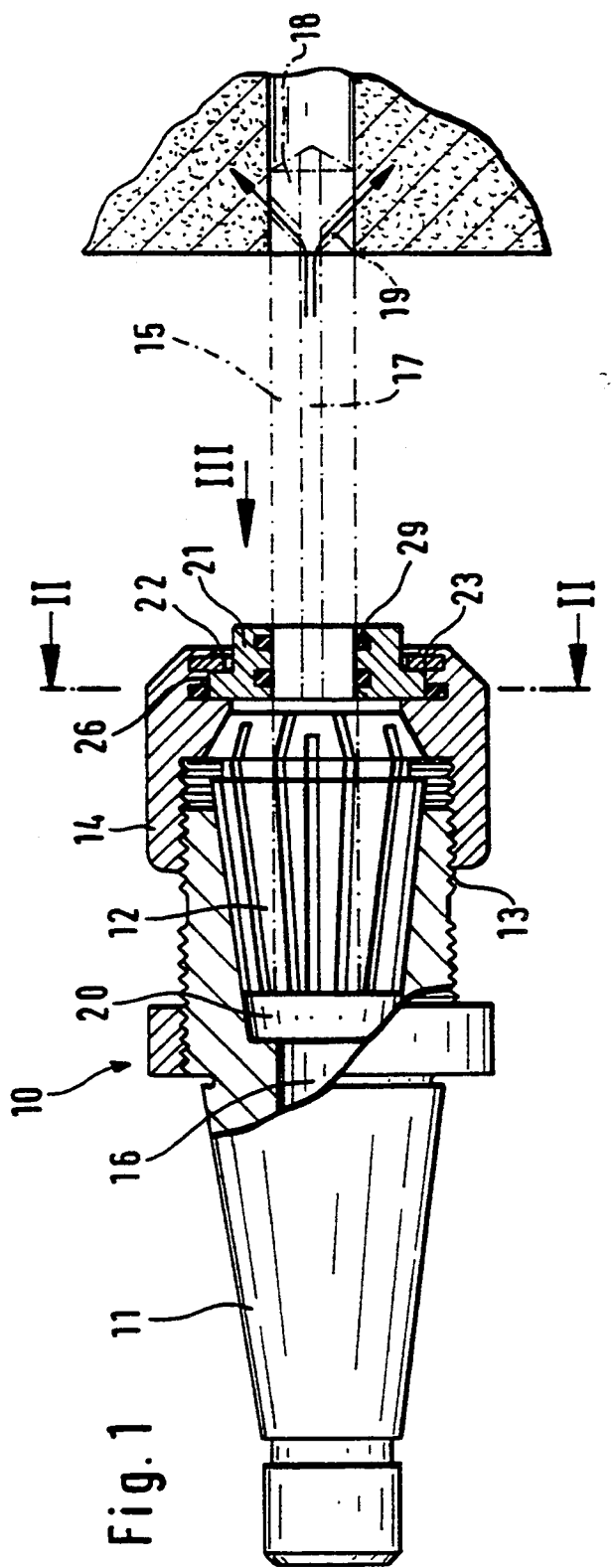
FIG. 1 is a side view of a chuck with a clamped drilling tool, partially in a central longitudinal section.

A chuck for a rotary and stationary tool is identified with reference numeral 10 in FIG. 1. The chuck includes a clamp holder 11, a clamp 12 which is inserted in a front, central and conical opening of the clamp holder and is subdivided into individual plates, and a clamping nut 14 which is screwed on an outer thread 13 of the clamp holder 11. A drill shaft 15 is shown in dash-dot line. Its central clamping is performed in a known manner by inserting the clamp 12 into the conically reducing front recess of the clamp holder 11, by means of the clamping nut 14 provided with a throughgoing opening for the tool shaft 15.

The chuck is formed for a tool with an inner cooling medium supply. For this purpose, the clamp holder 11 has a central axial cooling medium supply passage 16 which ends in the conical front recess for the clamp 12. The cooling medium is supplied through the clamp 12 from the chuck into a central axial cooling medium opening 17 of the drill shaft 15. The drill blades for cooling the blades. cooling medium flows on the drill head 18 through lateral outward passages 19 to the drilling locations in the region of the drill blades for cooling the blades.

Figure 3:
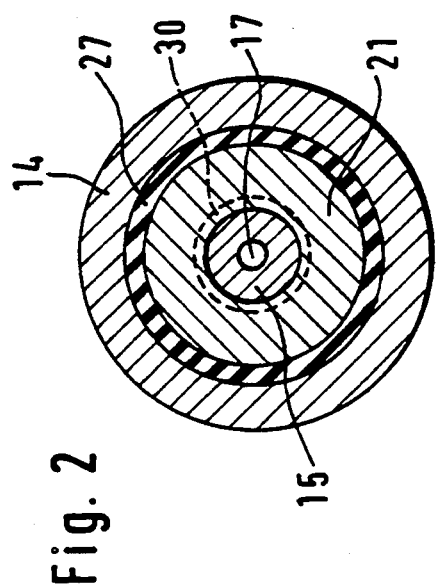
FIG. 3 is a view showing an axial view of the sealing member in direction of the arrow III in FIG. 1.

The sealing of the front recess 20 of the clamp holder 11 from outside is performed by the clamping nut 14. It guarantees on the one hand a sealing at the area of its threaded connection with the clamp holder 11, which with the conventional cooling medium pressures, can provide a sufficient labyrinth sealing action without additional means. On the other hand, a sealing in the region of the central throughgoing opening of the clamping nut 14 is performed for a tool shaft 15 by means of a sealing member 21 which is insertable into an outer concentric opening 22 of the clamping nut 14 and is exchangeably anchorable there by a spring ring 23. The sealing member 21 has a central throughgoing opening 24 which corresponds to the diameter of the drill shaft 15. The sealing member 21 has a shoulder which is shown in FIG. 3, and a spring ring 23 abuts against this shoulder.

Figure 2:
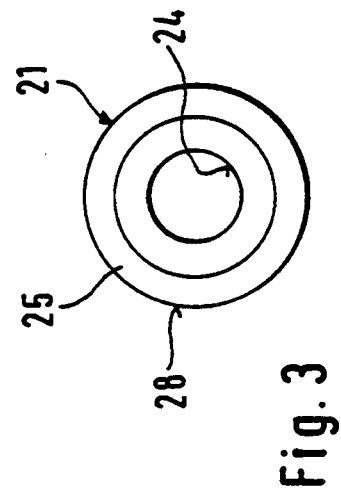
FIG. 2 is a view showing a section through the chuck provided with the sealing body, taken along the line II—II in FIG. 1.

The clamping nut 14 is provided in the region of the front recess 22 with a circumferential groove 26. An O-sealing ring 26 which is shown in the cross-section of FIG. 2 is inserted in the circumferential groove and performs a sealing with the circumferential wall 28 of the sealing member 21 shown in FIG. 3. The sealing member 21 is also provided in its wall of the throughgoing opening 24 which faces the tool shaft 15, with two axially spaced ring grooves 29. The grooves 29 also serve for receiving O-sealing rings 30. In FIG. 2 one of the sealing rings 30 is shown. It performs a sealing of the inserted sealing member 21 against the tool shaft 15.

The spring ring 23 can be removed also in the clamped condition of the chuck, so that the sealing member 21 can be pulled over the drill shaft 15. On the other hand, a sealing member 21 can be fitted on the clamped tool and anchored by the spring ring 23.

It will be understood that each of the elements described above, or two or more together, may also find a useful application in other types of constructions differing from the types described above.

While the invention has been illustrated and described as embodied in a chuck for a tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A chuck for a tool with an inner cooling medium supply, comprising a clamp holder having a cooling medium supply passage, a clamping nut anchorable in said clamp holder; and a ring-shaped sealing member which is carried by said clamping nut so as to abut against a clamped tool, said clamping nut having an outer concentric recess which surrounds the inserted tool and is formed so that said sealing member being is arranged in said recess exchangeably insertable from outside without releasing said clamping nut.

2. A chuck as defined in claim 1, wherein said sealing men%her has an outer shoulder, said holding means including a spring ring which is accessible from outside and engages with said outer shoulder of said sealing member so as to provide an abutment of said sealing member against said clamping nut.

3. A chuck as defined in claim 2, wherein said ring-shaped sealing member at its radial inner side which faces an inserted tool shaft is provided with at least one ring groove; and further comprising an O-sealing ring received in said ring groove.

4. A chuck as defined in claim 3, wherein said recess of said clamping nut has a limiting wall; and further comprising at least one sealing ring arranged between said ring-shaped sealing member and said limiting wall of said recess.

5. A chuck for a tool with an inner cooling medium supply, comprising a clamp holder having a cooling medium supply passage; a clamping nut anchorable in said clamp holder; a ring-shaped sealing member which is carried by said clamping nut and abuts against a clamped tool, said clamping nut having an outer concentric recess which surrounds the inserted tool and is formed so that said sealing member is arranged in said recess exchangeably insertable from outside into said recess; and means for holding said ring-shaped sealing member in abutment against said clamping nut.

* * * * *